United States Patent Office 3,667,982
Patented June 6, 1972

3,667,982
PLASTICS COATED MATERIAL
Edwards Bukalders, Barnsley, England, assignor to Bukflex Processes Limited, Barnsley, England
No Drawing. Filed June 29, 1970, Ser. No. 50,912
Int. Cl. B44c 1/02, 5/00
U.S. Cl. 117—10                                   11 Claims

ABSTRACT OF THE DISCLOSURE

The invention comprises a method of producing a grained effect on the face of a layer of thermoplastic material coated on to a sheet of pliable carrier material, in which a protective film is applied to the surface of said layer, and the material is tumbled or crumbled to distort the layer to produce the grained effect.

---

This invention relates to the manufacture of plastics coated sheet material and particularly to a method of providing the plastics surface with a grained effect.

It is well known to provide surface coatings on sheet material and particularly to apply such coatings to natural or synthetic textile materials and also to make such coatings to simulate the appearance of leather by giving them a grained effect. The most common way of applying such grained effect is to submit the sheet material to an embossing process by the use of an engraved roller or rollers.

According to the present invention there is provided a method of producing a grained effect on the face of a layer of thermoplastic material coated on to a sheet of pliable carrier material, in which a protective film is applied to the surface of the layer, and the material is tumbled or crumpled to distort the layer to produce the grained effect.

The term "protective film" as used herein is to be construed as meaning a film which will not stick to itself during the tumbling or crumpling action, and which will protect the surface of the layer of thermoplastic material against damage during such action.

Preferably the tumbling or crumpling is carried out while the thermoplastic material is uncured.

Alternatively the thermoplastic material is partly cured before tumbling or crumpling, which is carried out while the fabric is heated.

Conveniently the film is a film of plastics material which is applied in solution to the surface of the layer and caused or allowed to dry before tumbling or crumpling.

The film may be transparent, pigmented and/or have a matte surface and conveniently comprises cellulose acetobutyrate, and acrylic or silicone resin, or any other suitable non tacky film-forming material.

The aforesaid tumbling may take place in a dry chamber. Crumpling may be carried out intermittently in stages during linear movement of the material.

In a particular embodiment of this invention plastics coated sheet material may be produced in known manner, and of a desired colour, wherein a carrier sheet or web is furnished with one or more coatings of plastics material. The plastics coating may consist of at least one isocyanate polyester modified by the addition of at least one polyisocyanate. For example, the fabric can be coated with polyurethane which is then furnished with a protective surface film whilst the plastics coated is still uncured. Conveniently, the film may comprise cellulose acetobutyrate or an acrylic or silicone resin which provides a protection to allow the coated fabric to be processed further to obtain a grained effect in its surface. The protective film is transparent (unless it is pigmented) and may be allowed to dry at room temperature or submitted to an elevated temperature. Moreover, this film may be applied within, say 3 to 16 hours of the application of the plastics coating. Preferably the film is of a character which crosslinks or cures and is insoluble in solvents and therefore resistant to cleaning solvents or solutions.

The aforesaid surface film treatment prevents the thermoplastic coating sticking to itself or any other surface during the further processing which is intended to produce random creasing and/or rippling and/or wrinkling of the thermoplastic coating. Conveniently, the coated fabric is submitted to a free tumbling action in a chamber or other confined space or is crumpled in a fashion which will provide random creasing and/or wrinkling of the surface of the still uncured or partly-cured coating in a fashion that produces a leather grain-like effect.

It is considered that the amount of the protective surface film applied is sufficient in the region of 2 to 4 grams solids per square yard. This film may be applied by a roller, doctor blade or spraying action.

The aforesaid tumbling or crumpling action has been found to create permanent creases and/or wrinkles and/or ripples at random and these by selection can give a fine to rough grained appearance which is mainly dependent upon the form of surface of the selected carrier sheet or web before the application of the polyurethane or other thermoplastic material coating. The finished effect is also, to some extent, dependent upon the period of time of the tumbling or crumpling action. The term "selection" is used to refer to selection of the type of carrier material, the thickness of the thermoplastic material coating (which may be two or more layers) and the period of tumbling or crumpling. Two or more coatings of the thermoplastic material are preferably applied one immediately after the other and this leaves a smooth outer face. When the protective film is applied later the time of application affects the finished result after tumbling or crumpling. For example, if the application is early, within the required processing limits, it will penetrate the surface of the thermoplastic coatings so that when the grain is formed by the tumbling or crumpling action, which in effect crazes the film, the material is breathable. The longer the coated material is left, within said processing limits, before application of the film the less permeable and more waterproof the finished material becomes.

The graining process can be accelerated by slightly heating the coated fabric and this can be carried out by the use of dry steam or some other heating medium. This heating of the fabric, which may be before or during the tumbling or crumpling action, will become necessary if the polyurethane has started to crosslink or cure. If the polyurethane coating has become fully cured then only a slight graining effect will be obtained.

The tumbling action can be carried out in a cylinder-type drum rotating at a slow speed, say 30 r.p.m., so that a coated length of fabric is continually being lifted and allowed to fall within the drum. The latter may be furnished with means to facilitate the tumbling action.

The crumpling action may be carried out in various ways including passing a length of processed material along a trough or tunnel which is constricted at required points so that the material is crumpled and then allowed to expand intermittently in stages.

It has been found that by this improved method plastics coated fabric can be produced with an effect similar to various types of natural leather and that the time of tumbling or crumpling and the form of the carrier material surface determines the degree and depth of the graining effect. The graining action also tends to soften the material and gives a soft feel to the final product which is breathable or not as stated aforesaid. The protective film may include a matting agent to provide a matte surface, or pigments to produce a coloured effect.

The invention can be applied to substantially any form of carrier, e.g., woven or non-woven material, rubber or plastics material expanded or solid, natural or synthetic fibres.

What I claim is:

1. A method of producing a laminate having a grained surface effect comprising coating a layer of thermoplastic material on to a sheet of pliable carrier material, applying a protective film to the surface of said layer and then, with said layer less than fully cured, subjecting the combined sheet, layer, and protective film to crumpling to produce a grained effect on the surface of said layer and a crazing of the film, thus resulting in a breathable laminate.

2. A method according to claim 1 in which the crumpling is effected by tumbling the combined sheet, layer, and protective film in a dry chamber.

3. A method according to claim 1 in which the crumpling is effected by passing a length of the combined sheet, layer, and protective film through a passage having restricted points and allowing the same to expand intermittently between stages.

4. A method according to claim 1 in which the crumpling is effected while the laminate is heated.

5. A method to claim 1 in which the film is a plastic which is applied in solution to the surface of said layer and the crumpling is carried out when the film is dry.

6. A method according to claim 5 in which the film is transparent.

7. A method according to claim 5 in which the film is pigmented.

8. A method according to claim 5 in which the film comprises cellulose acetobutyrate.

9. A method according to claim 5 in which the film comprises acrylic resin.

10. A method according to claim 5 in which the film comprises silicone resin.

11. A method according to claim 5 in which the thermoplastic material is comprised of an isocyanate polyester modified by the addition of a polyisocyanate.

References Cited

UNITED STATES PATENTS

| | | | |
|---|---|---|---|
| 3,082,510 | 3/1963 | Kelly et al. | 117—41 |
| 3,429,729 | 2/1969 | McCarthy | 117—11 |
| 3,341,396 | 9/1967 | Iverson | 117—45 |

ALFRED L. LEAVITT, Primary Examiner

M. F. ESPOSITO, Assistant Examiner

U.S. Cl. X.R.

117—11, 45, 62, 109